US008443890B2

(12) United States Patent
Hoch et al.

(10) Patent No.: US 8,443,890 B2
(45) Date of Patent: May 21, 2013

(54) METHODS OF STIMULATING LIQUID-SENSITIVE SUBTERRANEAN FORMATIONS

(75) Inventors: Ottmar F. Hoch, Calgary (CA); Matthew E. Blauch, Duncan, OK (US); Thomas D. Welton, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 11/324,931

(22) Filed: Jan. 4, 2006

(65) Prior Publication Data

US 2007/0151729 A1 Jul. 5, 2007

(51) Int. Cl.
E21B 43/26 (2006.01)
E21B 33/13 (2006.01)

(52) U.S. Cl.
USPC .................. 166/308.1; 166/292; 166/305.1

(58) Field of Classification Search
None
See application file for complete search history.

(56) References Cited

U.S. PATENT DOCUMENTS

| | | | | |
|---|---|---|---|---|
| 3,070,159 A * | 12/1962 | Marx | ............ | 166/261 |
| 3,857,444 A * | 12/1974 | Copeland | ............ | 166/276 |
| 4,241,791 A * | 12/1980 | Davies et al. | ............ | 166/292 |
| 4,524,835 A | 6/1985 | Mingrone | | |
| 4,669,543 A * | 6/1987 | Young | ............ | 166/276 |
| 4,670,501 A | 6/1987 | Dymond et al. | | |
| 5,178,218 A * | 1/1993 | Dees | ............ | 166/281 |
| 5,199,490 A | 4/1993 | Surles et al. | ............ | 166/270 |
| 5,249,627 A * | 10/1993 | Harms et al. | ............ | 166/308.2 |
| 5,258,137 A | 11/1993 | Bonekamp et al. | | |
| 5,265,462 A | 11/1993 | Blauch et al. | ............ | 73/38 |
| 5,272,916 A | 12/1993 | Blauch et al. | ............ | 73/151 |
| 5,277,062 A | 1/1994 | Blauch et al. | ............ | 73/153 |
| 5,310,002 A | 5/1994 | Blauch et al. | ............ | 166/276 |
| 5,318,123 A | 6/1994 | Venditto et al. | ............ | 166/250 |
| 5,331,155 A | 7/1994 | Blauch | ............ | 250/255 |
| 5,360,066 A | 11/1994 | Venditto et al. | ............ | 166/250 |
| 5,462,120 A * | 10/1995 | Gondouin | ............ | 166/380 |
| 5,464,061 A | 11/1995 | Wilson et al. | | |
| 5,494,108 A | 2/1996 | Palmer et al. | | |
| 5,580,379 A | 12/1996 | Cowan | | |
| 5,833,000 A | 11/1998 | Weaver et al. | | |
| 5,839,510 A * | 11/1998 | Weaver et al. | ............ | 166/276 |
| 5,853,048 A | 12/1998 | Weaver et al. | | |
| 5,871,049 A | 2/1999 | Weaver et al. | | |
| 6,439,309 B1 | 8/2002 | Matherly et al. | | |
| 6,632,778 B1 * | 10/2003 | Ayoub et al. | ............ | 507/202 |
| 7,036,597 B2 * | 5/2006 | O'Brien et al. | ............ | 166/308.2 |
| 7,131,491 B2 | 11/2006 | Blauch et al. | ............ | 166/276 |
| 7,178,596 B2 | 2/2007 | Blauch et al. | ............ | 166/280.2 |
| 7,185,702 B2 | 3/2007 | Blauch et al. | ............ | 166/300 |
| 7,204,311 B2 | 4/2007 | Welton et al. | ............ | 166/295 |
| 7,261,156 B2 | 8/2007 | Nguyen et al. | ............ | 166/276 |
| 7,261,157 B2 | 8/2007 | Nguyen et al. | ............ | 166/278 |
| 7,264,051 B2 | 9/2007 | Nguyen et al. | ............ | 166/276 |
| 7,299,877 B2 | 11/2007 | Welton et al. | ............ | 166/308.6 |
| 7,303,019 B2 | 12/2007 | Welton et al. | ............ | 166/307 |
| 7,318,474 B2 | 1/2008 | Welton et al. | ............ | 166/280.1 |
| 7,484,654 B2 | 2/2009 | Tibbles et al. | | |
| 2003/0054962 A1 * | 3/2003 | England et al. | ............ | 507/117 |
| 2004/0159433 A1 | 8/2004 | England et al. | | |
| 2004/0194961 A1 | 10/2004 | Nguyen et al. | | |
| 2004/0256099 A1 * | 12/2004 | Nguyen et al. | ............ | 166/249 |
| 2005/0049151 A1 * | 3/2005 | Nguyen et al. | ............ | 507/203 |
| 2005/0092489 A1 | 5/2005 | Welton et al. | ............ | 166/280.2 |
| 2005/0274517 A1 * | 12/2005 | Blauch et al. | ............ | 166/280.2 |
| 2005/0277554 A1 * | 12/2005 | Blauch et al. | ............ | 507/224 |
| 2006/0065400 A1 | 3/2006 | Smith | | |
| 2006/0113080 A1 | 6/2006 | Nguyen et al. | ............ | 166/308.1 |
| 2006/0118300 A1 | 6/2006 | Welton et al. | | |
| 2006/0191686 A1 | 8/2006 | Blauch et al. | ............ | 166/300 |
| 2006/0243449 A1 | 11/2006 | Welton et al. | ............ | 166/307 |
| 2006/0260810 A1 | 11/2006 | Weaver et al. | | |
| 2007/0007010 A1 | 1/2007 | Welton et al. | ............ | 166/280.2 |
| 2007/0034378 A1 | 2/2007 | Welton et al. | ............ | 166/308.6 |
| 2007/0039733 A1 | 2/2007 | Welton et al. | ............ | 166/276 |
| 2007/0042912 A1 | 2/2007 | Welton et al. | ............ | 507/203 |
| 2007/0155630 A1 | 7/2007 | Hoch et al. | | |
| 2007/0281868 A1 | 12/2007 | Pauls et al. | ............ | 507/213 |
| 2007/0289781 A1 | 12/2007 | Rickman et al. | ............ | 175/65 |
| 2008/0011478 A1 | 1/2008 | Welton et al. | ............ | 166/280.2 |
| 2008/0039346 A1 | 2/2008 | Welton et al. | ............ | 507/131 |
| 2008/0039347 A1 | 2/2008 | Welton et al. | ............ | 507/213 |

OTHER PUBLICATIONS

Schlumberger Oilfield Glossary, definition of "mist," retrieved Jan. 25, 2013 from http://www.glossary.oilfield.slb.com/en/Terms.aspx?LookIn=term%20name&filter=mist.*
Hoch, *The Dry Coal Anomaly—The Horseshoe Canyon Formation of Alberta, Canada*, SPE 95872, Society of Petroleum Engineers, 2005.
Search Report and Written Opinion of International Application No. PCT/GB2006/004847 Mailed Apr. 13, 2007 and Filed on Dec. 21, 2006.
Office Action for U.S. Appl. No. 11/324,930, dated Feb. 27, 2009.
Office action in U.S. Appl. No. 11/324,930, dated Oct. 21, 2009.
Office Action for U.S. Appl. No. 11/324,930 dated Apr. 9, 2010.
Office Action for U.S. Appl. No. 11/324,930 dated Aug. 9, 2010.
Office Action for U.S. Appl. No. 11/324,930 dated Jan. 14, 2011.
Office Action for U.S. Appl. No. 11/324,930 dated May 17, 2011.
Office Action for U.S. Appl. No. 12/878,450 dated Jun. 16, 2011.

* cited by examiner

*Primary Examiner* — Angela M DiTrani
(74) *Attorney, Agent, or Firm* — Robert A. Kent; McDermott Will & Emery LLP

(57) ABSTRACT

A method comprising: providing a stimulation fluid that comprises a stimulating gas and a consolidating agent; and injecting the stimulation fluid into a portion of a liquid-sensitive formation at a pressure sufficient to create or enhance a pathway therein. Suitable consolidating agents include aqueous tackifying agents, curable compositions, and noncurable and nonaqueous consolidating compositions.

18 Claims, No Drawings

METHODS OF STIMULATING LIQUID-SENSITIVE SUBTERRANEAN FORMATIONS

CROSS-REFERENCE TO RELATED APPLICATIONS

The present invention is related to U.S. application Ser. No. 11/324,930 entitled "Compositions for Stimulating Liquid-Sensitive Formations," filed on the same date herewith, the entire disclosure of which is incorporated herein by reference.

BACKGROUND OF THE INVENTION

The present invention relates to enhancing the permeability of subterranean formations for the production of hydrocarbons through stimulation, and more particularly, to stimulation methods for enhancing the permeability of liquid-sensitive subterranean formations. "Liquid-sensitive subterranean formations" are those subterranean formations that are sensitive to liquids (whether aqueous or hydrocarbon). These formations may form undesirable precipitates when contacted with an aqueous liquid, for example. In other instances, for example in a dry CBM well in Canada, the combination of very low porosity with very low reservoir pressure may trap an aqueous liquid, i.e., the capillary pressure is higher than the reservoir pressure so the reservoir pressure cannot expel the liquid once it gets into the pores of the formation. One type of liquid-sensitive subterranean formation is a dry coal bed methane ("CBM") formation. A "dry coal bed methane" formation as that term is used herein refers to a coal formation that does not produce an appreciable level of free water. Another example is a low water content CBM formation. A "low water content CBM" formation as that term is used herein refers to a CBM formation that may produce some free water, but not a continuous volume. Other examples include any formation that can be hydraulically stimulated where aqueous liquid sensitivity is an issue (e.g., shale gas wells with ultra-low permeability, undersaturated or underpressured reservoirs). An "ultra-low permeability" formation as that term is used herein refers to a formation having a permeability of less than 0.1 mD. A "low permeability" formation as that term is used herein refers to a formation having a permeability of about 1 mD or less. A dry gas well that can produce water is an example of a potentially hydrocarbon liquid sensitive situation because introduction of a hydrocarbon may impact the relative permeability because the hydrocarbon can act as a trapped phase in the pore system. Formations that contain a large amount of organic shales may behave similarly.

Coal is the most abundant fossil fuel in the world; its recoverable reserves amount to almost 100 quintillion BTU of energy, nearly 15 times the total energy content estimated for known reserves of petroleum. People have mined coal and used it for heat for centuries. However, relatively recently coal has been recognized for being the origin and source for coal bed methane gas, another valuable hydrocarbon fuel. Coal bed methane gas consists primarily of methane (e.g., 95%) but may also contain ethane, propane, and higher homologs. At times, the volume of coal bed methane may be estimated to be about 400 trillion standard cubic feet (SCF) of gas in place, most of it adsorbed on coal in seams buried at a depth of less than 9000 feet (ft) from the surface, and almost half of it is on coal seams buried less than 3000 ft, too deep to mine but easily penetrated by a well bore using conventional drilling techniques. Coal beds are, therefore, reservoirs and source rocks for a huge amount of gas that can be produced, in part, through a well bore. Much research has been directed to recovering coal bed methane.

Coal is a dual porosity rock consisting of micropores and a network of natural fractures known as cleats. The term "cleats" as used herein with respect to coal seams includes openings or pathways in the rock that are generally more or less vertical or transverse to the bedding plane, along which no appreciable movement between the surfaces of either side of the opening has occurred. At the time of our discovery, it is believed that the cleat network and micropores in a coal seam are saturated with water, and methane is adsorbed to the surface of coal. Reservoir pressure depletion is a mechanism currently being employed to desorb methane from coal. When production of coal bed methane is initiated, water contained in the coal cleat network flows to the well bore, as per Darcy's Law. This leads to a reduction in reservoir pressure, which in turn, is thought to desorb methane from the coal surface. Thus, the gas production rate from a well may be directly influenced by the speed with which a coal seam is de-watered. While methane migrates from the coal matrix to the cleat network by diffusion, the water contained in the coal micropores (typically 40 Angstrom or smaller pores linked by 5 Angstrom passages) remains essentially immobile due to strong capillary forces. Thus, even though most of the porosity in coal is contained within the micropores, the cleat porosity and its irreducible water saturation are important to a coal bed methane project. Although the above is the common case with coal formations, it has been discovered recently (e.g., in western Canada) that coal systems exist that do not have this mobile water component. These formations may be especially liquid-sensitive.

In an effort to enhance porosity within liquid-sensitive formations such as CBM formations and shale formations, stimulation processes may be used. Compressible gas streams (such as nitrogen) often are used in these stimulation processes rather than aqueous fracturing fluids due to the liquid sensitivity of the formations. A compressible gas hydraulic fracturing process is a stimulation technique which provides the parting energy to break up the natural planes of weakness within the formation rock; a gas squeeze is a technique to impart nitrogen into the formation rock planar structure to expand or otherwise enhance pathways therein. A typical stimulation process usually involves injecting a compressible gas at a high rate and pressure for a short period of time (e.g., minutes vs. hours) into a zone of the formation. "Zone" as used herein simply refers to a portion of the formation and does not imply a particular geological strata or composition. Proppant particulates are not usually used, at least in part, because methods of introducing proppants into gas streams are not yet well developed or in widespread use due to inherent difficulties associated with carrying proppants in a gas stream. These techniques aim to enhance or create pathways within the formation rock through which produced gases may flow. The term "pathway" as used herein refers to any channel, void, or the like that may exist in a liquid-sensitive formation or may be created or enhanced in a subterranean formation through a stimulation technique; no particular mechanism of forming the pathways is implied by the term. Examples of pathways include cleat paths, fractures, microfractures, vertical fractures, horizontal fractures, shattering fractures, face cleats, butt cleats, bedding planes, slickensides, sheet pores, and the like.

In some instances, the bottomhole pumping pressures used may be two to three times the overburden pressure of the formation. In shale gas formations, typical bottomhole pressures would be at some level above the in situ fracturing stress. Additionally, in coal formations or other thin-bedded formation, each seam or zone usually is stimulated separately (e.g., with coiled tubing with a straddle cup packer assembly) from other seams or zones in the formation. Oftentimes, a coal formation may include up to 30 or more seams. Similarly formations with horizontal or deviated well bores through them may be stimulated at specific intervals to enhance gas production along the length of the well bore in contact with the formations. Additionally, these stimulation techniques pressurize and then depressurize the rock in the formation. Upon depressurization, shattering of the rock occurs, which is thought to enhance the desorption of the gas from the matrix. This may enhance diffusivity in addition to permeability.

Hydraulic fracturing of liquid sensitive formations without proppant relies on the rock to "self-prop" (meaning that the surface roughness of each rock face is such that when the fracture closes there is sufficient roughness to allow some conductivity in the fracture face, i.e., the rocks do not go back to a zero tolerance plane) or have enhanced permeability by having the cleats and fracture faces misaligned after the fracture closes. If the rock is soft, these sorts of pathways may not stay open to a sufficient degree. This may be because the fracture faces are not well misaligned, or the fracture face may plug with fines. Additionally, fines may be produced by the fracturing process and any subsequent in situ stress-induced fines generation (e.g., spalling), which can plug any pathways that might otherwise aid production. As a result of, inter alia, this fines migration and rock slippage, the productivity of the hydraulically fractured zone may be reduced significantly.

SUMMARY OF THE INVENTION

The present invention relates to enhancing the permeability of subterranean formations for the production of hydrocarbons through stimulation, and more particularly, to stimulation methods for enhancing the permeability of liquid-sensitive subterranean formations.

In one embodiment, the present invention provides a method comprising: providing a stimulation fluid that comprises a stimulating gas and a consolidating agent; and injecting the stimulation fluid into a portion of a liquid-sensitive formation at a pressure sufficient to create or enhance a pathway therein.

In another embodiment, the present invention provides a method of stimulating a liquid-sensitive subterranean formation comprising: providing a stimulation gas; adding a consolidating agent to the stimulating gas to form a stimulation fluid; and injecting the stimulation fluid into a liquid-sensitive subterranean formation.

In another embodiment, the present invention provides a method comprising: providing a stimulation fluid that comprises a stimulating gas and a consolidating agent; and injecting the stimulation fluid into the formation so as to enhance a pathway therein.

In one embodiment, the present invention provides a subterranean formation stimulation fluid comprising a stimulation gas and a consolidating agent.

In another embodiment, the present invention provides a zone in a liquid-sensitive subterranean formation comprising a pathway enhanced by a stimulation process comprising a stimulation fluid that comprises a stimulation gas and a consolidating agent.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to enhancing the permeability of subterranean formations for the production of hydrocarbons through stimulation, and more particularly, to stimulation methods for enhancing the permeability of liquid-sensitive subterranean formations. The methods of the present invention may be especially useful in CBM formations.

One of the many advantages of the present invention is that the stimulation fluids are able to stabilize the formation fines within the formation that may be problematic. This stabilization is thought to relatively immobilize the fines, and is often referred to as "fines control." Fines control is particularly important in CBM formations given the potential volume of the fines that may be present in such formations. Another advantage is that the fluids enhance the stability of any pathways formed as a result of the stimulation treatment. For instance, the consolidating agent in the fluids of the present invention may stabilize the enhanced state of shift of any rocks in a zone in the formation that may have shifted as a result of a stimulation treatment. Another example is that the consolidating agent may stabilize fines surrounding any pathways formed as a result of a stimulation treatment, which maintains their conductivity.

The compositions and methods of the present invention are suitable for any liquid-sensitive formation including, but not limited to, dry CBM formations, low water content CBM formations, shale formations, ultra-low permeability formations, naturally fractured formations, and any formation that has liquid sensitivity and that can be stimulated. Potential applications include formations that have a tendency to self-prop as well as those that contain primarily low-permeability rock. Potential applications also include formations with extreme water sensitivity. The resultant enhanced permeability of any wells stimulated according to the present invention may allow operators to be able to pursue more marginal wells economically than before. Also, the system is thought to be nondamaging to formations.

The stimulation fluids of the present invention for use in a liquid-sensitive formation comprise a stimulation gas and a consolidating agent. No particular mechanism of consolidation or stabilization is implied by the term "consolidating agent." The consolidating agents may provide adhesive bonding between formation particulates to alter the distribution of the particulates (e.g., fines) within the formation in an effort to reduce their potential negative impact on permeability and/or fracture conductivity, or provide adhesive bonding between the pathway faces to enhance the permeability of the shifted state caused by a stimulation treatment. In some embodiments, the consolidating agents may cause formation fines to become involved in collective stabilized masses and/or stabilize the formation fines in place to prevent their migration that might negatively impact permeability and/or fracture conductivity. Optionally, the stimulation fluids may comprise additional components such as suitable diluting agents, surfactants, and possibly, proppant particulates, and combinations thereof.

Adding a surfactant to a stimulation fluid of the present invention may be useful, e.g., to enhance the miscibility of the consolidating agent in the stimulation gas, to enhance the coating process on to the surfaces of the particulates and rocks in the formation, to aid in the recovery of any residual liquids in the formations, etc. Suitable surfactants include those that are compatible with the stimulation gas, the consolidating agent, or both. Cationic, anionic, nonionic, or amphoteric surfactants that may be used in subterranean applications are suitable. The choice of whether to use a surfactant will be governed at least in part by the mineralogy of the formation. One of ordinary skill in the art with the benefit of this disclosure art will recognize the potential usefulness of surfactants. Particularly useful surfactants may include the detergents sold under the trademarks TWEEN™ 20 (polysorbate 20), TWEEN™ 80 (polysorbate 80) (which may be available from unique or at various locations including Europe and Asia), and the phenoxypolyethoxyethanols like TRITON X-10™. A most preferred surfactant may be TRITON X-100™ (t-octylphenoxypolyethoxyethanol) (which may be available from Spectrum Chemicals and Laboratory Products, at www.spectrumchemical.com).

Whether proppant particulates may be used in conjunction with a stimulation fluid of the present invention will depend on whether the fluid can support the proppant and place it into a pathway created or enhanced in the formation. Usually, such gas stimulation fluids are not suitable for delivering particulates as part of the treatment. Generally speaking, however, if possible, it is usually advantageous to use proppant to prop pathways to maintain conductivity. However, these potential advantages should be balanced with the ability of the fluid to carry and place the proppant within the formation. If used, a wide variety of particulate materials may be used as proppant in accordance with the present invention, including, but not limited to, sand; bauxite; ceramic materials; glass materials; polymer materials; "TEFLON™" (tetrafluoroethylene) materials; ground or crushed nut shells; ground or crushed seed shells; ground or crushed fruit pits; processed wood; composite particulates prepared from a binder with filler particulate including silica, alumina, fumed carbon, carbon black, graphite, mica, titanium dioxide, meta-silicate, calcium silicate, kaolin, talc, zirconia, boron, fly ash, hollow glass microspheres, and solid glass; or mixtures thereof. Low-density proppant particulates may be more suitable than higher density alternatives. The proppant used may have a particle size in the range of from about 2 to about 400 mesh, U.S. Sieve Series. Preferably, the proppant is graded sand having a particle size in the range of from about 10 to about 70 mesh, U.S. Sieve Series. Preferred sand particle size distribution ranges are one or more of 10/20 mesh, 20/40 mesh, 30/50 mesh, 40/60 mesh, or 50/70 mesh, depending on the particle size and distribution of the formation particulates to be screened out by the proppant. 100 mesh to 50 mesh may be preferred in some shale and CBM formations. Smaller proppants are preferred generally as larger proppants may tend to pack off pathways, which may be undesirable.

1. Suitable Stimulation Gases

Any stimulation gas that is suitable for use in stimulation methods in subterranean formations may be used in the stimulation fluids of the present invention. Examples include nitrogen, air, carbon dioxide, propane, ammonia, and the like, and combinations thereof. Dry nitrogen is preferred. As recognized by one skilled in the art, some gases may present different or more cumbersome handling concerns than others, and those concerns should be taken into account when performing a stimulation method of the present invention. For instance, carbon dioxide and propane are normally liquids when pumped, and then they tend to gasify downhole. A preferred gas is nitrogen because, inter alia, it is usually less expensive than other options. In a preferred embodiment of the methods of the invention, the nitrogen is pumped as a liquid, and heated to form a gas as it is being pumped. A sufficient rate and amount of the stimulation gas should be present in a stimulation fluid of the present invention to pressurize the formation. In some embodiments, this may be from about 2,000 to about 3,000 standard cubic meters of gas per meter of zone thickness at a rate ranging from about 500 standard cubic meters per minute per meter of zone thickness up to about 2000 standard cubic meters per minute.

In some embodiments, a hydrocarbon carrier that is miscible or soluble in the stimulation gas may be added. Examples include liquid propane, liquefied natural gas, liquefied hydrocarbon gases, gas condensates with carbon chain lengths ranging from $C_8$ to $C_{10}$, methane, and the like, and combinations and derivatives thereof. Such a carrier may be useful to carry proppant or add the consolidating agent to the hydrocarbon carrier. A hydrocarbon carrier may be advantageously employed in an amount from about 0.1% to about 70% by volume of the stimulation fluid in some embodiments. A preferred range may be from about 0.1% to about 10%.

2. Suitable Consolidating Agents

Suitable consolidating agents include aqueous tackifying agents, curable compositions, and noncurable and nonaqueous consolidating compositions. The choice of which to use will be guided by environmental considerations, handling concerns, clean-up concerns, and the like. In most instances, aqueous tackifying agents are preferred. However, if there are sufficient concerns that the formation cannot handle the aqueous tackifying agents, then other consolidating agents may be more appropriate. One of ordinary skill in the art with the benefit of this disclosure will recognize which consolidating agent may be most suited for a given application. Some advantages associated with using the aqueous tackifying agents include: desirable environmental considerations; ease of application and use; and the nonhardening nature of the aqueous tackifying agents in that they do not become brittle but rather remain tacky in the formation. Curable compositions may aid soft formations in hardening the planar rock face surfaces to enhance the self propping effects and prevent embedment or loss of flow capacity or fracture conductivity.

a. Aqueous Tackifying Agents

Suitable aqueous tackifying agents generally include charged polymers that comprise compounds that, when in an aqueous solvent or solution, will form a non-hardening coating (by themselves or optionally with an activator).

Examples of aqueous tackifying agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly(butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacryate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers, and combinations thereof. Methods of determining suitable aqueous tackifying agents and additional disclosure on aqueous tackifying agents can be found in U.S. patent application Ser. No. 10/864,061, filed Jun. 9, 2004, and U.S. patent application Ser. No. 10/864,618, filed Jun. 9, 2004, the relevant disclosures of which are hereby incorporated by reference.

Some suitable tackifying agents are described in U.S. Pat. No. 5,249,627 by Harms, et al., the relevant disclosure of which is incorporated by reference. Harms discloses aqueous tackifying agents that comprise at least one member selected from the group consisting of benzyl coco di-(hydroxyethyl) quaternary amine, p-T-amyl-phenol condensed with formaldehyde, and a copolymer comprising from about 80% to about 100% $C_{1-30}$ alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. Suitable hydrophillic monomers may be any monomer that will provide polar oxygen-containing or nitrogen-containing groups. Suitable hydrophillic monomers include dialkyl amino alkyl (meth) acrylates and their quaternary addition and acid salts, acrylamide, N-(dialkyl amino alkyl) acrylamide, methacrylamides and their quaternary addition and acid salts, hydroxy alkyl (meth)acrylates, unsaturated carboxylic acids such as methacrylic acid or preferably acrylic acid, hydroxyethyl acrylate, acrylamide, and the like. These copolymers can be made by any suitable emulsion polymerization technique. Methods of producing these copolymers are disclosed, for example, in U.S. Pat. No. 4,670,501, the relevant disclosure of which is incorporated herein by reference.

Typically, most suitable aqueous tackifying agents are solution-based polymers; they are usually available in about 20% to 40% concentrations. In some embodiments, the aqueous tackifying agent is about a 40% solution in water, with possibly other small amounts of surfactants or other additives being present. One skilled in the art with the benefit of this disclosure will envision readily dried polymer compositions as well as diluted compositions (e.g., polymer concentrations of less than about 20%).

In some instances, an activator for the aqueous tackifying agent may be useful, for example, where the stimulating gas is not dry. Acids such as acetic acid are examples of suitable activators. Delayed release acids may also be suitable activators. These may include acid precursors, and encapsulated acids.

b. Curable Compositions

The curable compositions suitable for use in the methods of the present invention comprise a resin and a solvent. "Resin" as used herein refers to any of numerous physically similar polymerized synthetics or chemically modified natural resins including thermoplastic materials and thermosetting materials. One should note that the choice of solvent can be made so as to not be problematic for the liquid-sensitive formations.

Resins suitable for use in the curable compositions of the present invention include all resins known in the art that are capable of consolidating formation fines into a stabilized mass or stabilizing the rock faces within the formation. Many such resins are commonly used in subterranean consolidation operations, and some suitable resins include: two component epoxy based resins; novolak resins; polyepoxide resins; phenol-aldehyde resins; urea-aldehyde resins; urethane resins; phenolic resins; furan resins; furan/furfuryl alcohol resins; phenolic/latex resins; phenol formaldehyde resins; polyester resins and hybrids and copolymers thereof; polyurethane resins and hybrids and copolymers thereof; acrylate resins; and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing.

The curable compositions suitable for use in the methods of the present invention preferably have a viscosity of about 1 cP to about 100 cP, more preferably a viscosity of 20 cP or less, and most preferably a viscosity of 10 cP or less. Although these compositions are especially preferred for use in the methods of the present invention due to, inter alia, pumping considerations, the formation conditions, viscosity, cost, and safety issues, any suitable resin should work.

Selection of a suitable resin may be affected by the temperature of the subterranean formation to which the fluid will be introduced. By way of example, for subterranean formations having a bottom hole static temperature ("BHST") ranging from about 40° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable.

Solvents may be useful. Any solvent that is compatible with the chosen resin and achieves the desired viscosity effect is suitable for use in the curable compositions. Some preferred solvents are those having lower flash points to enhance miscibility with the produced gas. Such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d-limonene, fatty acid methyl esters, and combinations thereof. Other preferred solvents include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin chosen and is within the ability of one skilled in the art with the benefit of this disclosure.

c. Noncurable and Nonaqueous Consolidating Compositions

One type of noncurable and nonaqueous consolidating composition suitable for use in the present invention comprises polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as noncurable and nonaqueous consolidating compositions include liquids and solutions of, for example, polyesters, polycarbonates and polycarbamates, natural resins such as shellac, and the like. Other suitable noncurable and nonaqueous consolidating compositions are described in U.S. Pat. No. 5,853,048 issued to Weaver, et al. and U.S. Pat. No. 5,833,000 issued to Weaver, et al., the relevant disclosures of which are herein incorporated by reference.

Noncurable and nonaqueous consolidating compositions suitable for use in the present invention may be either used such that they form a non-hardening coating or they may be combined with a multifunctional material capable of reacting with the noncurable compositions to form a hardened coating downhole. A "hardened coating" as used herein means that the reaction of the tackifying compound with the multifunctional material will result in a substantially non-flowable reaction product that exhibits a higher compressive strength in a consolidated agglomerate than the tackifying compound alone. In this instance, the noncurable and nonaqueous consolidating compositions may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the tackifying compound in an amount of from about 0.01% to about 50% by weight of the tackifying compound to effect formation of the reaction product. In some preferable embodiments, the compound is present in an amount of from about 0.5% to about 1% by weight of the tackifying compound. Suitable multifunctional materials are described in U.S. Pat. No. 5,839,510 issued to Weaver, et al., the relevant disclosure of which is herein incorporated by reference.

Solvents suitable for use with the noncurable and nonaqueous consolidating compositions include any solvent that is compatible with a particular or chosen noncurable and nonaqueous consolidating composition, and achieves the desired viscosity effect. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d-limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether a solvent is needed to achieve a viscosity suitable to the subterranean conditions and, if so, how much.

Optionally, silyl-modified polyamide compounds may be used in the methods of the present invention as noncurable and nonaqueous consolidating compositions, and may be described as substantially self-hardening compositions that are capable of at least partially adhering to formation fines in the unhardened state, and that are further capable of self-hardening themselves to a substantially non-tacky state to which individual particulates such as formation fines will not adhere to, for example, formation pathway faces. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309 issued to Matherly, et al., the relevant disclosure of which is herein incorporated by reference.

In preferred embodiments, the consolidating agents may be introduced to the stimulation gas as a liquid or mist on-the-fly. A high pressure chemical injection pump or low-rate fluid pumper may be used. In an example of such an embodiment, the mist would comprise a low concentration of a suitable consolidating agent, generally from about 0.01% to about 100% (e.g., in a slug application) of the volume of a stimulation fluid at in-situ treatment volume. In preferred embodiments, the amount may be up to about 20%.

In one embodiment, the present invention provides a method that comprises the steps of: providing a stimulation fluid that comprises a stimulation gas and a consolidating agent; and injecting the stimulation fluid into a portion of an liquid-sensitive formation at a pressure sufficient to create or enhance a pathway therein. Existing coiled tubing technology with existing dual-cup packers may be used in such a method. In some embodiments, the pressure used may be up to about 4 times the fracture gradient. Generally speaking, at least in some instances, the pressure limit may be that pressure which is equal to or greater than the overburden pressure.

To facilitate a better understanding of the present invention, the following examples of certain aspects of some embodiments are given. In no way should the following examples be read to limit, or define, the scope of the invention.

EXAMPLES

Example 1

Consolidating Agent with Coal

Description of Experiment:

25 grams of coal obtained from a coal mine in Utah were lightly disarticulated using a mortar and pestle to obtain a wide distribution of angular coal cleat blocks ranging from approximately two centimeters down to dust particle size. The disarticulated coal was then placed into a 5 inch square "weigh boat" (Fisherbrand Polystyrene Anti-Static Weighing Dishes), and sprayed with a concentrated aqueous tackifying agent as described herein. The amount of the aqueous tackifying agent sprayed was sufficient to lightly coat the coal particles without pooling or running of liquid from the surfaces. A stream of air was then applied across the particles.

Observations:

Upon application of an air stream, no airborne particles were observed in the air stream. All coal particles appeared to be bonded to the larger coal surfaces, which we believe rendered the smaller particles immobile in the gas stream. Upon further air drying for approximately 15 minutes, the aggregate of coal was sufficiently tackified to enable the inversion of the weight boat to a vertical position without the significant loss or "dumping" of particles from the container, which we believe indicated particle to particle adhesion sufficient to affect angle of repose. Smaller particles were found to be well adhered to the larger particles and the weigh boat surface.

Example 2

Well Application

In a prophetic application on a well, the outlet of a high-pressure chemical injection pump would be connected to a high pressure nitrogen pump line, which in turn would be connected from high-rate, high-pressure nitrogen pump to a well's tubing. The nitrogen would be pumped at 1300 scm/min for 2000 scm for a 1-meter thick coal zone. This is equivalent to 25 m$^3$ nitrogen volume at a bottomhole treatment pressure of 8 MPa. For a total 1.54 minutes of pumping time, the aqueous tackifying agent would be pumped at 65 L/min for the first 0.62 minutes. Thus 40 liters of aqueous tackifying agent should form a mist with the first 10 m$^3$ of the total 25 m$^3$ of treatment volume. The nitrogen used for the treatment would be a dessicated anhydrous nitrogen stream.

The features and advantages of the present invention will be readily apparent to those skilled in the art. While numerous changes may be made by those skilled in the art, such changes are within the spirit of the invention.

What is claimed is:

1. A method comprising:
providing a compressible gas stream and a mist comprising a consolidating agent;
introducing the mist into the compressible gas stream to form a stimulation fluid having the compressible gas stream as a continuous phase of the stimulation fluid and the mist as a discontinuous phase of the stimulation fluid;
injecting the stimulation fluid into a portion of a liquid-sensitive formation at a pressure greater than the overburden pressure of the formation up to about 4 times the fracture gradient, wherein the liquid-sensitive formation comprises at least one liquid-sensitive formation selected from the group consisting of a coal bed methane formation, a dry coal bed methane formation, a low water content coal bed methane formation, a shale formation, and a formation having a permeability of about 1 mD or less.

2. The method of claim 1 wherein the compressible gas stream comprises at least one stimulation gas selected from the group consisting of nitrogen, air, carbon dioxide, propane, and ammonia.

3. The method of claim 1 wherein the consolidating agent comprises at least one consolidating agent selected from the group consisting of: an aqueous tackifying agent, a curable composition, and a noncurable and nonaqueous consolidating composition.

4. The method of claim 3 wherein the aqueous tackifying agent comprises at least one aqueous tackifying agent selected from the group consisting of: benzyl coco di-(hydroxyethyl) quaternary amine, p-T-amyl-phenol condensed with formaldehyde; and a copolymer comprising from about 80% to about 100% C1-30 alkylmethacrylate monomers and from about 0% to about 20% hydrophilic monomers.

5. The method of claim 3 wherein the curable composition has a viscosity in the range of from about 1 cP to about 100 cP.

6. The method of claim 3 wherein the noncurable and nonaqueous consolidating composition comprises a multifunctional material.

7. The method of claim 6 wherein the multifunctional material comprises at least one multifunctional material selected from the group consisting of: an aldehyde; formaldehyde; a dialdehyde; glutaraldehyde; a hemiacetal; an aldehyde releasing compound; a diacid halide; a dihalide; a dichloride; a dibromide; a polyacid anhydride; citric acid; an epoxide; furfuraldehyde; and an aldehyde condensate.

8. The method of claim 3 wherein the aqueous tackifying agent comprises at least one aqueous tackifying agent selected from the group consisting of: an acrylic acid polymer; an acrylic acid ester polymer; an acrylic acid derivative polymer; an acrylic acid homopolymer; an acrylic acid ester homopolymer; poly(methyl acrylate); poly (butyl acrylate); poly(2-ethylhexyl acrylate); an acrylic acid ester co-polymer; a methacrylic acid derivative polymer; a methacrylic acid homopolymer; a methacrylic acid ester homopolymer; poly (methyl methacrylate); poly(butyl methacrylate); poly(2-ethylhexyl methacrylate); an acrylamido-methyl-propane sulfonate polymer; an acrylamido-methyl-propane sulfonate derivative polymer; an acrylamido-methyl-propane sulfonate co-polymer; and an acrylic acid/acrylamido-methyl-propane sulfonate co-polymer.

9. The method of claim 3 wherein the noncurable and nonaqueous consolidating composition comprises at least one noncurable and nonaqueous consolidating composition selected from the group consisting of: a condensation reaction product comprised of a commercially available polyacid and a polyamine; a mixture of C36 dibasic acids containing some trimer and higher oligomers and also small amounts of monomer acids that are reacted with polyamines; a polyacid; a trimer acid; a synthetic acid produced from fatty acids; maleic anhydride; acrylic acid; a liquid or solution of polyesters, polycarbonates, polycarbamates, or natural resins; and a silyl-modified polyamide.

10. The method of claim 3 wherein the noncurable and nonaqueous consolidating composition includes a solvent that comprises at least one solvent selected from the group consisting of: butylglycidyl ether; dipropylene glycol methyl ether; butyl bottom alcohol; dipropylene glycol dimethyl ether; diethyleneglycol methyl ether; ethyleneglycol butyl ether; methanol; butyl alcohol; isopropyl alcohol; diethyleneglycol butyl ether; propylene carbonate; d-limonene; 2-butoxy ethanol; butyl acetate; furfuryl acetate; butyl lactate; dimethyl sulfoxide; dimethyl formamide; and a fatty acid methyl ester.

11. The method of claim 1 further comprising adding a plurality of proppant particulates to the stimulation fluid before injecting the stimulation fluid into the portion of the liquid-sensitive formation.

12. The method of claim 1 wherein the concentration of the consolidating agent in the stimulation fluid is between about 0.1% and about 20% by volume of the stimulation fluid.

13. A method comprising:
providing a compressible gas stream;
adding a mist comprising a consolidating agent to the compressible gas stream to form a stimulation fluid having the compressible gas stream as a continuous phase of the stimulation fluid and the mist as a discontinuous phase of the stimulation fluid; and
injecting the stimulation fluid into a liquid-sensitive formation, wherein the liquid-sensitive formation comprises at least one liquid-sensitive formation selected from the group consisting of a coal bed methane formation, a dry coal bed methane formation, a low water content coal bed methane formation, a shale formation, and a formation having a permeability of about 1 mD or less.

14. The method of claim 13 wherein the consolidating agent comprises at least one aqueous tackifying agent selected from the group consisting of: an acrylic acid polymer; an acrylic acid ester polymer; an acrylic acid derivative polymer; an acrylic acid homopolymer; an acrylic acid ester homopolymer; poly(methyl acrylate); poly(butyl acrylate); poly(2-ethylhexyl acrylate); an acrylic acid ester co-polymer; a methacrylic acid derivative polymer; a methacrylic acid homopolymer; a methacrylic acid ester homopolymer; poly(methyl methacrylate); poly(butyl methacrylate); poly(2-ethylhexyl methacrylate); an acrylamido-methyl-propane sulfonate polymer; an acrylamido-methyl-propane sulfonate derivative polymer; an acrylamido-methyl-propane sulfonate co-polymer; and an acrylic acid/acrylamido-methyl-propane sulfonate co-polymer.

15. The method of claim 13 wherein the stimulation fluid comprises a plurality of proppant particulates.

16. The method of claim 13 wherein the concentration of the consolidating agent in the stimulation fluid is between about 0.1% and about 20% by volume of the stimulation fluid.

17. A method of enhancing a pathway in a liquid-sensitive subterranean formation comprising:
   providing a compressible gas stream and a mist comprising a consolidating agent;
   introducing the mist into the compressible gas stream to form a stimulation fluid having the compressible gas stream as a continuous phase of the stimulation fluid and the mist as a discontinuous phase of the stimulation fluid;
   then adding a plurality of proppant particulates to the stimulation fluid; and
   then injecting the stimulation fluid into a liquid-sensitive formation at a pressure greater than the overburden pressure of the formation up to about 4 times the fracture gradient, wherein the liquid-sensitive formation comprises at least one liquid-sensitive formation selected from the group consisting of a coal bed methane formation, a dry coal bed methane formation, a low water content coal bed methane formation, a shale formation, and a formation having a permeability of about 1 mD or less.

18. The method of claim 17 wherein the concentration of the consolidating agent in the stimulation fluid is between about 0.1% and about 20% by volume of the stimulation fluid.

* * * * *